(12) United States Patent
Hernandez

(10) Patent No.: US 9,713,564 B2
(45) Date of Patent: Jul. 25, 2017

(54) MODEL DOLLS AND METHODS FOR MAKING THE SAME

(71) Applicant: WSM Investment LLC, Chatsworth, CA (US)

(72) Inventor: Antonio Hernandez, Canyon Country, CA (US)

(73) Assignee: WSM Investment LLC, Chatsworth, CA (US)

( * ) Notice: Subject to any disclaimer, the term of this patent is extended or adjusted under 35 U.S.C. 154(b) by 701 days.

(21) Appl. No.: 13/645,911

(22) Filed: Oct. 5, 2012

(65) Prior Publication Data
US 2014/0099858 A1    Apr. 10, 2014

(51) Int. Cl.
| A63H 9/00 | (2006.01) |
| A63H 3/00 | (2006.01) |
| A61H 19/00 | (2006.01) |
| G09B 23/30 | (2006.01) |

(52) U.S. Cl.
CPC ............ *A61H 19/40* (2013.01); *A61H 19/32* (2013.01); *A63H 3/00* (2013.01); *A63H 9/00* (2013.01); *G09B 23/30* (2013.01); *Y10T 29/4998* (2015.01)

(58) Field of Classification Search
CPC . A63H 3/00; A63H 3/365; A63H 9/00; A63H 3/36; G09B 23/30
See application file for complete search history.

(56) References Cited

U.S. PATENT DOCUMENTS

| 1,592,536 | A | * | 7/1926 | O'Neill | .................. | A63H 9/00 |
| | | | | | | 106/38.27 |
| 2,089,376 | A | * | 8/1937 | Jacobson | .............. | A63H 3/003 |
| | | | | | | 434/86 |
| 2,156,573 | A | * | 5/1939 | Schaeffer | ................ | A63H 9/00 |
| | | | | | | 446/385 |
| 2,606,398 | A | * | 8/1952 | Miller | ..................... | A63H 9/00 |
| | | | | | | 264/305 |
| 2,763,070 | A | * | 9/1956 | McCormick | .......... | G09B 23/34 |
| | | | | | | 434/273 |
| 3,432,581 | A | * | 3/1969 | Rosen | .................... | A63H 9/00 |
| | | | | | | 264/310 |
| 3,541,192 | A | * | 11/1970 | Shapero | ................. | A63H 9/00 |
| | | | | | | 264/310 |
| 3,699,714 | A | * | 10/1972 | Johnson | ................ | A63H 9/00 |
| | | | | | | 264/4 |
| 3,830,898 | A | * | 8/1974 | Johnson et al. | ........ | A63H 9/00 |
| | | | | | | 264/310 |

(Continued)

*Primary Examiner* — Gene Kim
*Assistant Examiner* — Alyssa Hylinski
(74) *Attorney, Agent, or Firm* — Anova Law Group, PLLC

(57) ABSTRACT

A doll is provided. The doll includes a layer of skin formed from a first material to simulate human skin. The skin has an interior side and an exterior side. The doll also includes a chamber enclosed by the layer of skin with the interior side of the skin facing the chamber. The doll further includes a filler made of a second material, different from the first material. The filler fills the space within the chamber. The skin is formed by placing the melted first material in a first mold configured to have an inside contour resembling a human body or body part up to a certain level of the first mold and, when the melted first material solidifies, removing certain amount of the melted first material such that the remaining first material in the first mold forms the skin with a thickness in the first mold.

20 Claims, 12 Drawing Sheets

(56) References Cited

U.S. PATENT DOCUMENTS

| | | | | |
|---|---|---|---|---|
| 4,439,162 A * | 3/1984 | Blaine | .................... | G09B 23/34 |
| | | | | 434/268 |
| 4,451,416 A * | 5/1984 | Burtscher | ............... | G09B 23/30 |
| | | | | 264/225 |
| 4,830,912 A * | 5/1989 | Weiss | ........................ | A01G 5/04 |
| | | | | 264/45.2 |
| 5,066,259 A * | 11/1991 | Acker | ....................... | A63H 3/36 |
| | | | | 446/369 |
| 5,630,745 A * | 5/1997 | Yeh | .......................... | A63H 3/04 |
| | | | | 446/374 |
| 6,494,763 B1 * | 12/2002 | Hastey | ..................... | A63H 3/46 |
| | | | | 446/376 |
| 6,558,221 B1 * | 5/2003 | Yang | ....................... | A63H 3/365 |
| | | | | 446/100 |
| 7,083,419 B2 * | 8/2006 | Winslow | ................ | G09B 23/30 |
| | | | | 434/267 |
| 7,186,212 B1 * | 3/2007 | McMullen | ............. | A63H 3/003 |
| | | | | 600/38 |
| 2002/0107431 A1 * | 8/2002 | More | ..................... | A61H 19/00 |
| | | | | 600/38 |
| 2003/0124952 A1 * | 7/2003 | Marine | .................... | A63H 3/36 |
| | | | | 446/385 |
| 2004/0122287 A1 * | 6/2004 | Minigh | ................. | G09B 23/30 |
| | | | | 600/38 |
| 2005/0027162 A1 * | 2/2005 | Paled | ................. | B29C 33/3835 |
| | | | | 600/38 |
| 2007/0232185 A1 * | 10/2007 | Wong | ....................... | A63H 3/36 |
| | | | | 446/268 |
| 2007/0292828 A1 * | 12/2007 | Kellermann | ......... | G09B 23/288 |
| | | | | 434/262 |
| 2013/0288565 A1 * | 10/2013 | McMullen | ............. | A63H 3/365 |
| | | | | 446/321 |

* cited by examiner

MODEL DOLLS AND METHODS FOR MAKING THE SAME

FIELD OF INVENTION

This invention relates generally to model dolls and the methods for making the same and, more particularly, to model dolls with a skin and methods for making the same.

BACKGROUND

Model dolls or artificial human body parts are extensively used in a variety of fields. For example, model dolls may be used as a child toy, an adult toy or sex toy, a mannequin, or an educational tool. Artificial human body parts may be used as an educational tool, a sex toy, or a prosthetic limb. Currently, many model dolls or artificial human body parts available on the market are made of plastic or other materials. As a result, the surface of the model dolls or artificial human body parts usually do not resemble a human skin. A user may feel uncomfortable when using such a model doll or artificial human part. Further, a user may prefer a doll or artificial human part that has human skin touch. For example, a user may desire that a sex stimulating doll feels like a human being, that is, the surface of the doll has a human skin-like texture. Further, even those dolls made with soft materials, such as silicon, they often require a large amount of such materials, which can be very costly and weigh heavily.

The disclosed dolls and methods for making the same are directed at solving one or more problems set forth above and other problems.

BRIEF SUMMARY OF THE DISCLOSURE

One aspect of the present disclosure provides a doll. The doll includes a layer of skin formed from a first material to simulate human skin. The skin has an interior side and an exterior side. The doll also includes a chamber enclosed by the layer of skin with the interior side of the skin facing the chamber. The doll further includes a filler made of a second material, different from the first material. The filler fills the space within the chamber. The skin is formed by placing the melted first material in a first mold configured to have an inside contour resembling a human body or body part up to a certain level of the first mold and, when the melted first material solidifies, removing certain amount of the melted first material such that the remaining first material in the first mold forms the skin with a thickness in the first mold.

Another aspect of the present disclosure provides an artificial human body or body part. The artificial human body or body part includes a skin formed from a third material to simulate human skin. The skin has an interior side and an exterior side. The exterior side of the skin resembles the outward appearance of the human body or body part. The human body or body part further includes a shell configured to have a contour resembling the human body or body part. The skin is formed by placing the melted third material in a second mold configured to have a contour resembling a human body or body part. The skin is attached to the shell with the interior side of skin contacting the shell to give the artificial human body or body part the appearance of the human body or body part.

Another aspect of the present disclosure provides a process of making an artificial human body or body part. In the process, a first mold configured to have an inside contour resembling a human body or body part is provided. A melted first material is placed into the first mold up to a certain level of the first mold. Certain amount of the melted first material is removed when the melted first material solidifies such that the remaining first material in the first mold forms a skin simulating human skin and having a human skin-like texture or tactile feel. The skin has an interior side and an exterior side, with the exterior side having the outward appearance of the human body or body part and a chamber being enclosed by the skin. The chamber is filled with a filler made of a second material, different from the first material, from an opening of the chamber such that the interior side of the skin contacting the filler.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
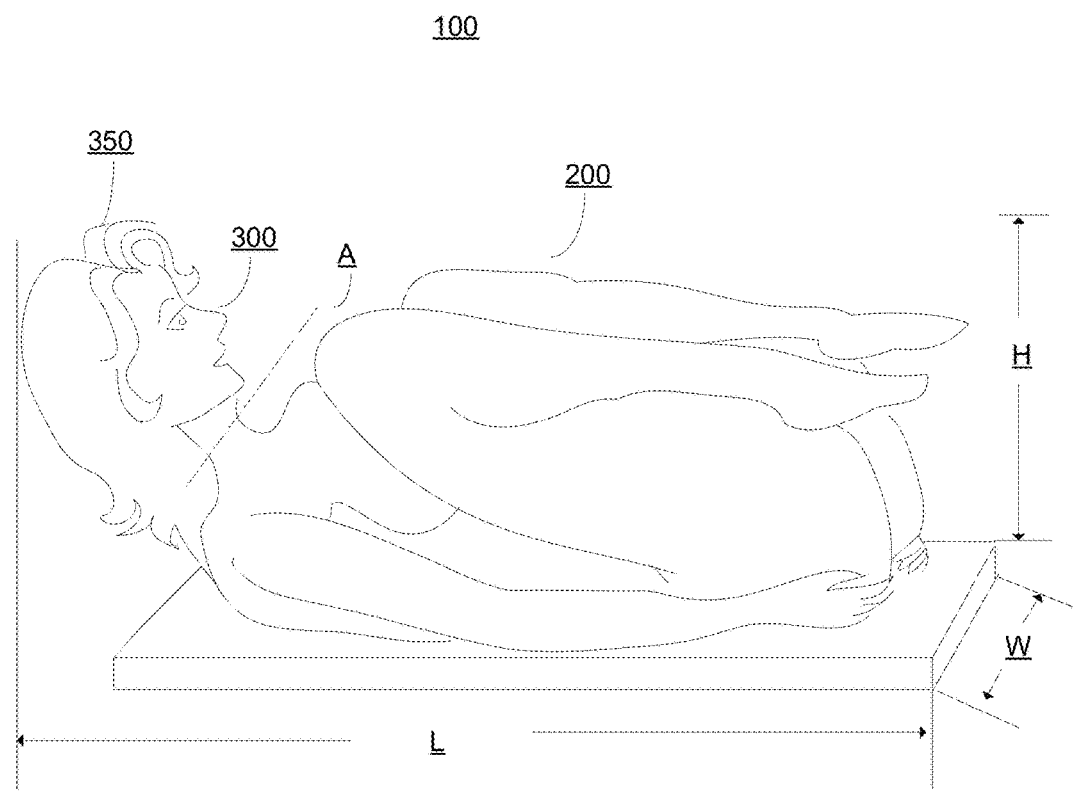
FIG. 1 illustrates an exemplary doll consistent with the disclosed embodiments.

FIG. 1 illustrates an exemplary doll 100 consistent with the disclosed embodiments. As shown in FIG. 1, the doll 100 includes a head portion 300 and a body 200. The doll 100 may also include a hair 350 on the head portion 300. The head portion 300 and the body 200 may be fabricated separately and assembled along a line A. The head portion 300 and the body 200 may also be fabricated together to form the doll 100.

The doll 100 may be made in different sizes. In certain embodiments, the doll 100 is about the size of an average adult human. For example, as shown in FIG. 1, the doll 100 may have a length dimension (L), a width dimension (W), and a height dimension (H). The length L may be ranged between about 2 to 3 feet, the width W may be ranged between about 1.5 to 2 feet, and the height H may be ranged between about 8 to 15 inches. After the size of one dimension, for example, the length dimension, is determined, other dimensions may be adjusted proportionally. In certain embodiments, the length L may be about 33 inches, the width W may be about 21 inches, and the height H may be about 10 inches.

Figure 2:
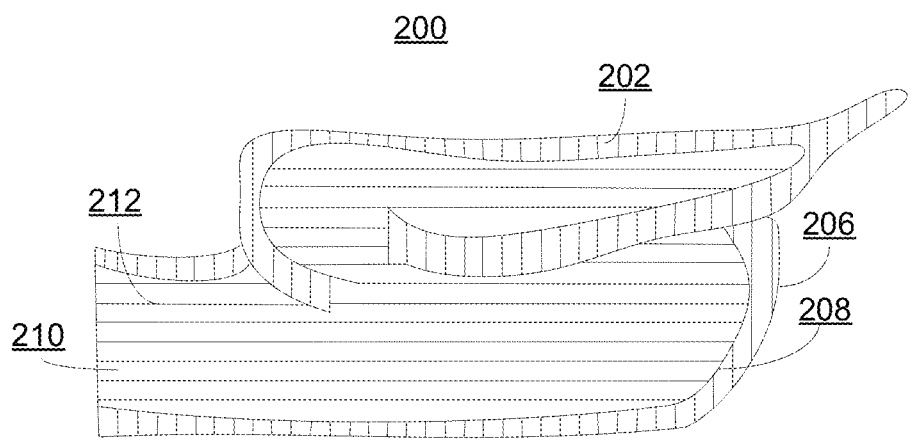
FIG. 2 illustrates an exemplary doll body consistent with the disclosed embodiments.

FIG. 2 illustrates an exemplary body 200 consistent with the disclosed embodiments. As shown in FIG. 2, the body 200 includes a skin 202 and a chamber 210 enclosed by the skin 202. The skin 202 has an exterior side 206 and an interior side 208. The chamber 210 may be filled with a filler 212.

The skin 202 is made of a first material, such as an elastomer, which may have a human skin-like texture or tactile feel. The first material may be chosen from a wide variety of materials, such as a thermoplastic elastomer or thermoplastic rubber (TPE/TPR), or a silicone. In certain embodiments, the CyberSkin® (Topco Sales) may be used to form the skin 202. To make the skin 202 that is generally soft, the first material may have a softness range from 00 to 20 in Shore Hardness OO scale. Materials of other softness may also be used.

The skin 202 forming the surface of the body 200 may be made as a single unit from one type of first material. On the other hand, the skin 202 may also be assembled from a plurality of parts. Different type of the first materials may be used to form different parts of the body. For example, the breast may be made from softer first material, such as a TPE/TPR with a softness below 10 in Shore Hardness OO scale, and the back may be made from relatively harder first material, such as a TPE/TPR with a softness above 10 in Shore Hardness OO scale.

The thickness of the skin 202 may be ranged from ⅛ inch to ½ inch. In certain embodiments, the thickness may be approximately ¼ inch. However, other thickness may also be used. The skin 202 may have substantially similar thickness throughout the body or the thickness of the skin 202 may be adjusted in different body parts. For example, the skin 202 on the breast may be thicker than the skin 202 on the back.

The skin 202 encloses the chamber 210. The chamber 210 may be filled with the filler 212. The filler 212 may be made of a light second material, such as a Urethane foam or a soft flexible Urethane foam. The softness, hardness and/or flexibility of the filler 212 may vary in different parts of the body 200. For example, in certain body part, such as breast, softer and more flexible Urethane foam may be used. In certain other body part, such as back, more rigid Urethane foam may be used.

Figure 3:
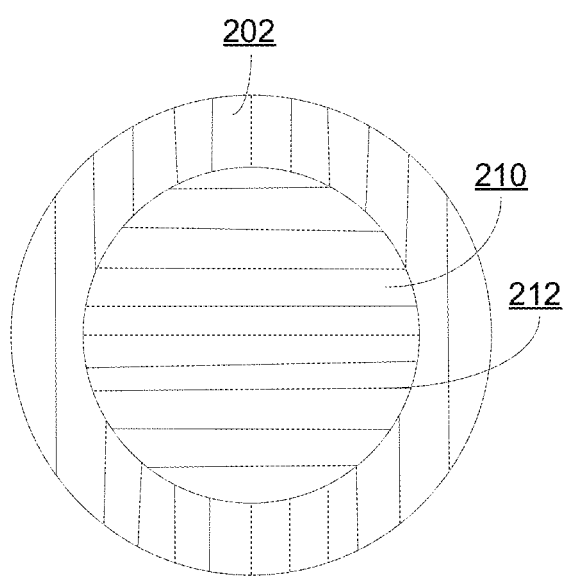
FIG. 3 illustrates the cross-section view of an exemplary doll body consistent with the disclosed embodiments.

FIG. 3 illustrates a cross-section view of an exemplary body 200 consistent with the disclosed embodiments. As shown in FIG. 3, the skin 202 encloses the chamber 210. The chamber 210 may be filled with the filler 212. The filler 212 is filled in the chamber 210 enclosed by the skin 202 such that the filler 212 may provide support for the skin 202, and the formed structure is sufficiently firm but also has substantially less weight than other type of structures.

Figure 4:
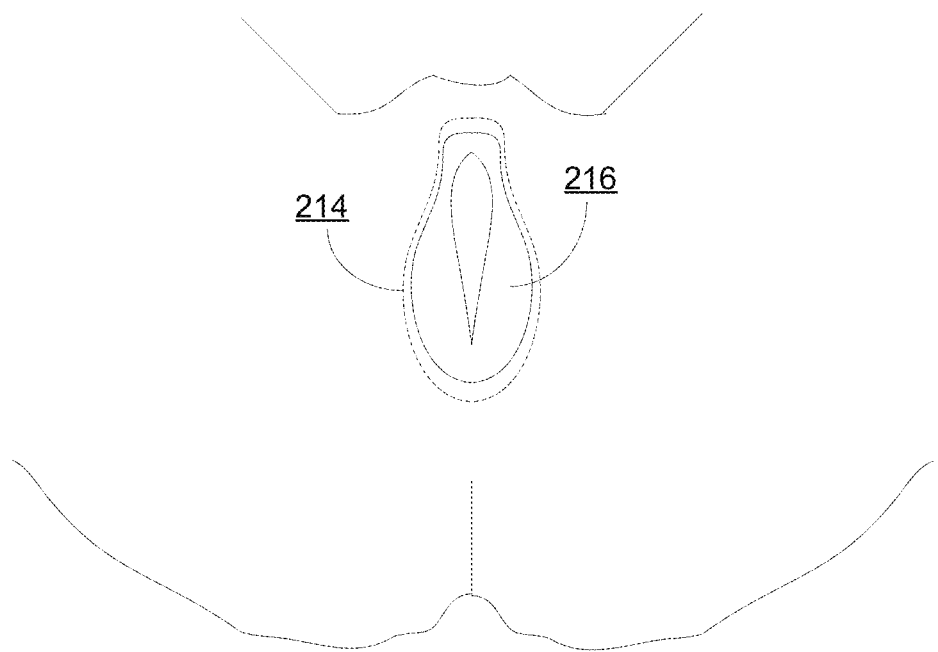
FIG. 4 illustrates certain area of an exemplary doll body consistent with the disclosed embodiments.

There may be an opening on the skin 202 simulating an orifice on human body, such as a vagina opening. FIG. 4 illustrates a genital area of an exemplary body 200 consistent with the disclosed embodiments. As shown in FIG. 4, an opening 214 is located at a position similar to that of the vagina opening on a female's body. An insert 216 may be placed within the opening 214. The skin 202 may have other openings resembling other orifices on human body, such as mouth or rectal orifice.

Figure 5:
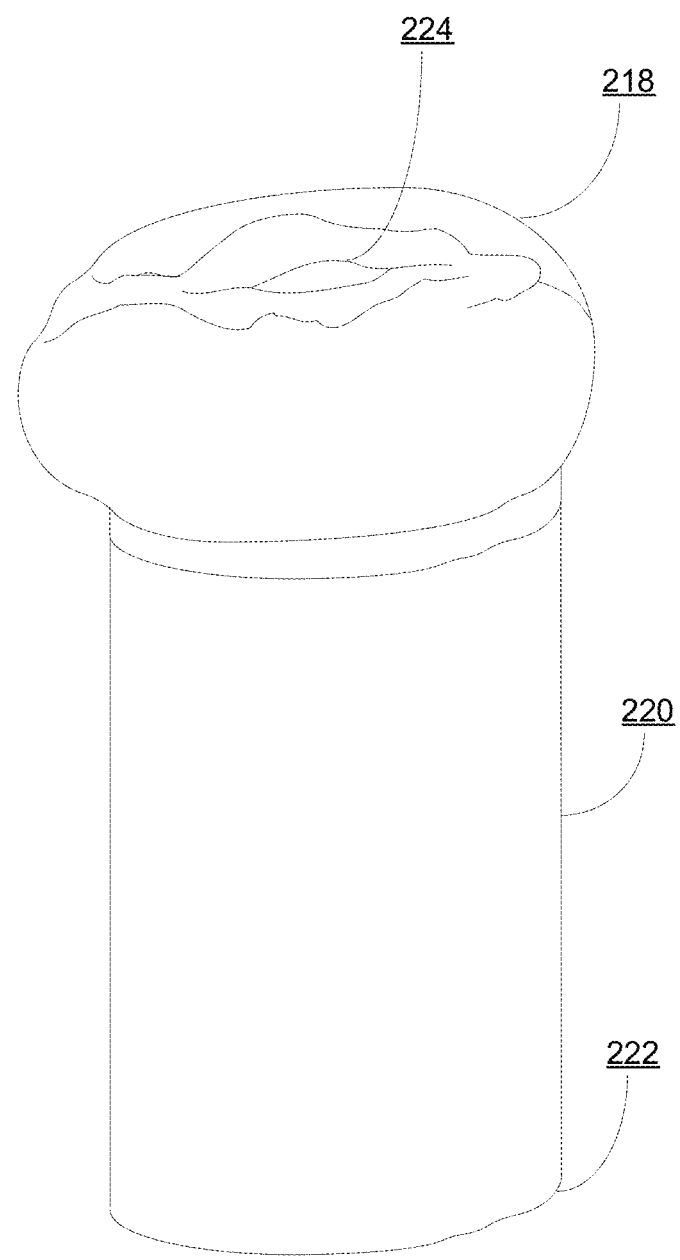
FIG. 5 illustrates an insert of an exemplary doll body consistent with the disclosed embodiments.

FIG. 5 illustrates an exemplary insert 216 consistent with the disclosed embodiments. As shown in FIG. 5, the insert 216 has a first end 218, a second end 222, a shaft 220, and an opening 224. The first end 218 and the opening 224 may have an appearance resembling the vagina opening of a human female. The opening 224 leads to a central passage (not shown in the drawing) within the shaft 220, which may accommodate an inserted object. The insert 216 may be made of materials having the general tactile feel of human flesh, such as a silicone, or a thermoplastic elastomer.

Figure 6:
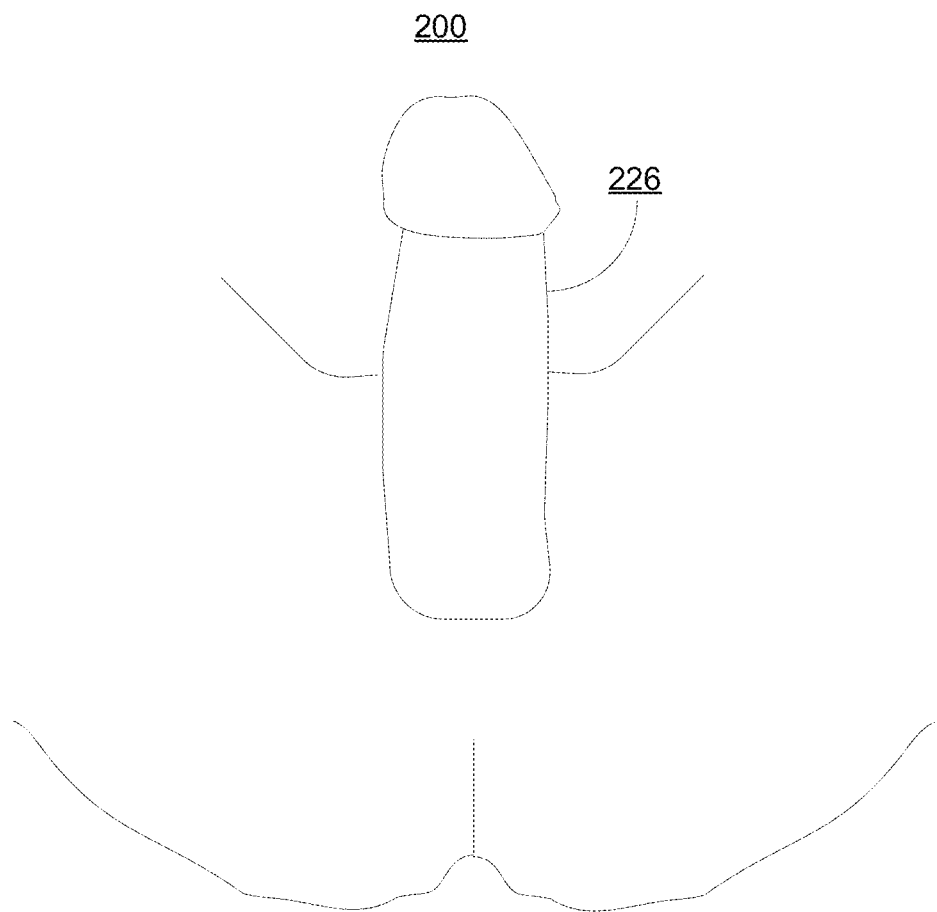
FIG. 6 illustrates certain area of an exemplary doll body consistent with the disclosed embodiments.

There may also be an appendage on the skin 202. FIG. 6 illustrates a genital area of an exemplary body 200 consistent with the disclosed embodiments. As shown in FIG. 6, an appendage 226 is attached to the skin 202. In certain embodiments, the appendage 226 resembles a male sex organ. The appendage 226 may be made of materials having the general tactile feel of human flesh, such as a silicone, or a thermoplastic elastomer. In certain embodiments, the appendage 226 may be made of materials with certain rigidity to resemble the erected male sex organ. More than one appendage may be attached to the skin 202.

An artificial human body part, such as a limb, may have the similar structure as the exemplary body 200. That is, the artificial human body part may have a skin similar to the skin 202 made of a first material with human-skin texture or tactile feel, a chamber similar to the chamber 210 enclosed by the skin, and a filler similar to the filler 212 filling the space of the chamber.

Figure 7:
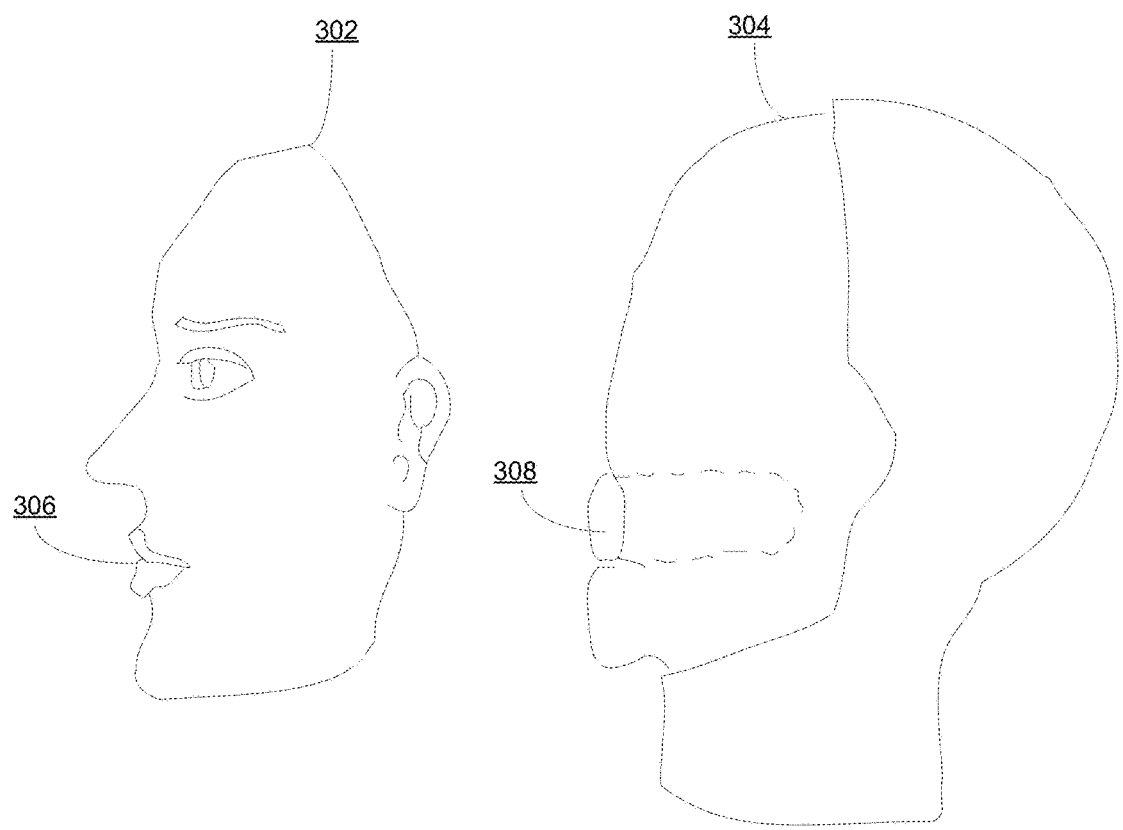
FIG. 7 illustrates an exemplary head portion consistent with the disclosed embodiments.

FIG. 7 illustrates an exemplary head portion 300 consistent with the disclosed embodiments. As show in FIG. 7, the head portion 300 includes a face mask 302 and a head 304. The face mask 302 may resemble a human face, with features such as eyes, eyebrows, nose, mouth and ears. There may be an opening 306 at the mouth of the face mask 302. The face mask 302 may cover only the frontal area of the head 304 or other area of the head 304. The size of the head portion 300 may vary. In certain embodiments, the head portion 300 is about the size of a head of an average adult human. For example, the distance between the top of the head 300 to the jaw of the head 300 may be about one foot. The size of the head portion 300 may be adjusted to fit on the body 200 to give the doll 100 an appearance of an average human. That is, the size of the head portion 300 may be substantially proportional to the size of the body 200.

The face mask 302 may be made of a third material similar to the first material forming the skin 202, such as a TPE/TPR. The third material may have a softness range from 00 to 20 in Shore Hardness OO scale. Materials of other softness range may also be used. In certain embodiments, the CyberSkin® (Topco Sales) may be used to form the face mask 302. The thickness of the face mask 302 may be ranged from ⅛ inch to ½ inch. In certain embodiments, the thickness may be approximately ¼ inch. However, other thickness may also be used. The thickness of the face mask 302 may be adjusted in different parts.

The head 304 may have a generic appearance of a human head, without the face features such as eyes or nose. The head 304 may have an opening 308 corresponding to the opening 306 on the face mask 302.

Figure 8:
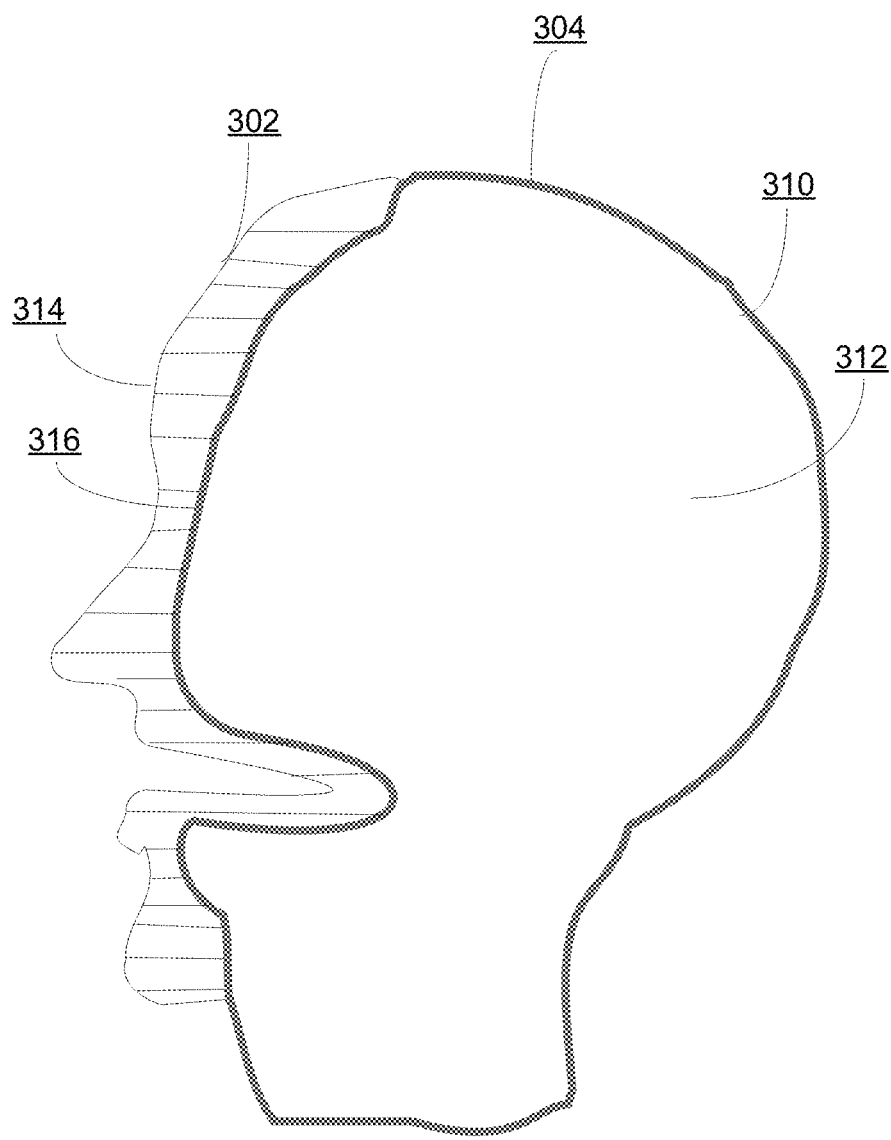
FIG. 8 illustrates the side cross-section view of an exemplary head portion consistent with the disclosed embodiments.

FIG. 8 illustrates a side cross-section view of an exemplary head portion 300 consistent with the disclosed embodiments. As shown in FIG. 8, the head 304 is formed by a shell 310, which encloses a chamber 312. The shell 310 is made of a material with certain hardness, such as a polyvinyl chloride (PVC) compound. In certain embodiments, the PVC compound is a plastisol. The material forming the shell 310 may have a hardness of about 90 in Shore Hardness A scale. Materials of other hardness may also be used as long as the material is hard enough to keep and hold the shape of the head 304. The shell 310 may have a thickness ranged from 1/16 inch to 1/8 inch. Other thickness may also be used.

The face mask 302 has an exterior side 314 and an interior side 316. The exterior side 314 has the human face features. The face mask 302 is attached to the head 304 with the interior side 316 contacting the head 304 to give the head portion 300 an appearance of a human head. In certain embodiments, the face mask 302 is permanently glued to the head 304 after an adhesive is applied to the interior side 316 of the face mask 302.

An artificial human body or a body part may have similar structure of the exemplary head portion 300. That is, the artificial human body or body part may have a skin similar to the face mask 302 resembling outward appearance of the human body or body part, a shell similar to the shell 310 resembling the shape of the human body or body part. The skin is attached to the shell to give the artificial human body or body part the appearance of the human body or body part.

Figure 9A:
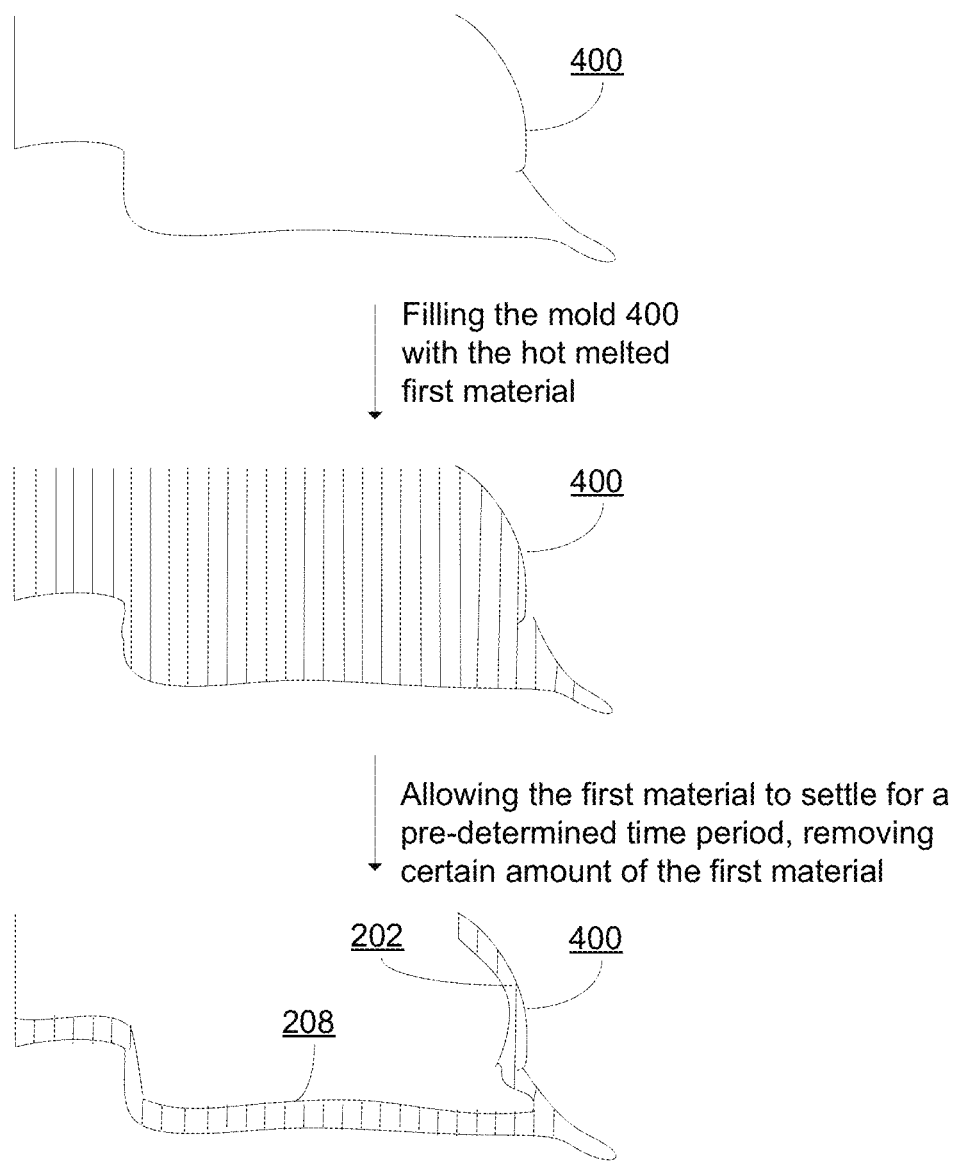
FIGS. 9A and 9B illustrate an exemplary process of making a doll body consistent with the disclosed embodiments.
Figure 9B:
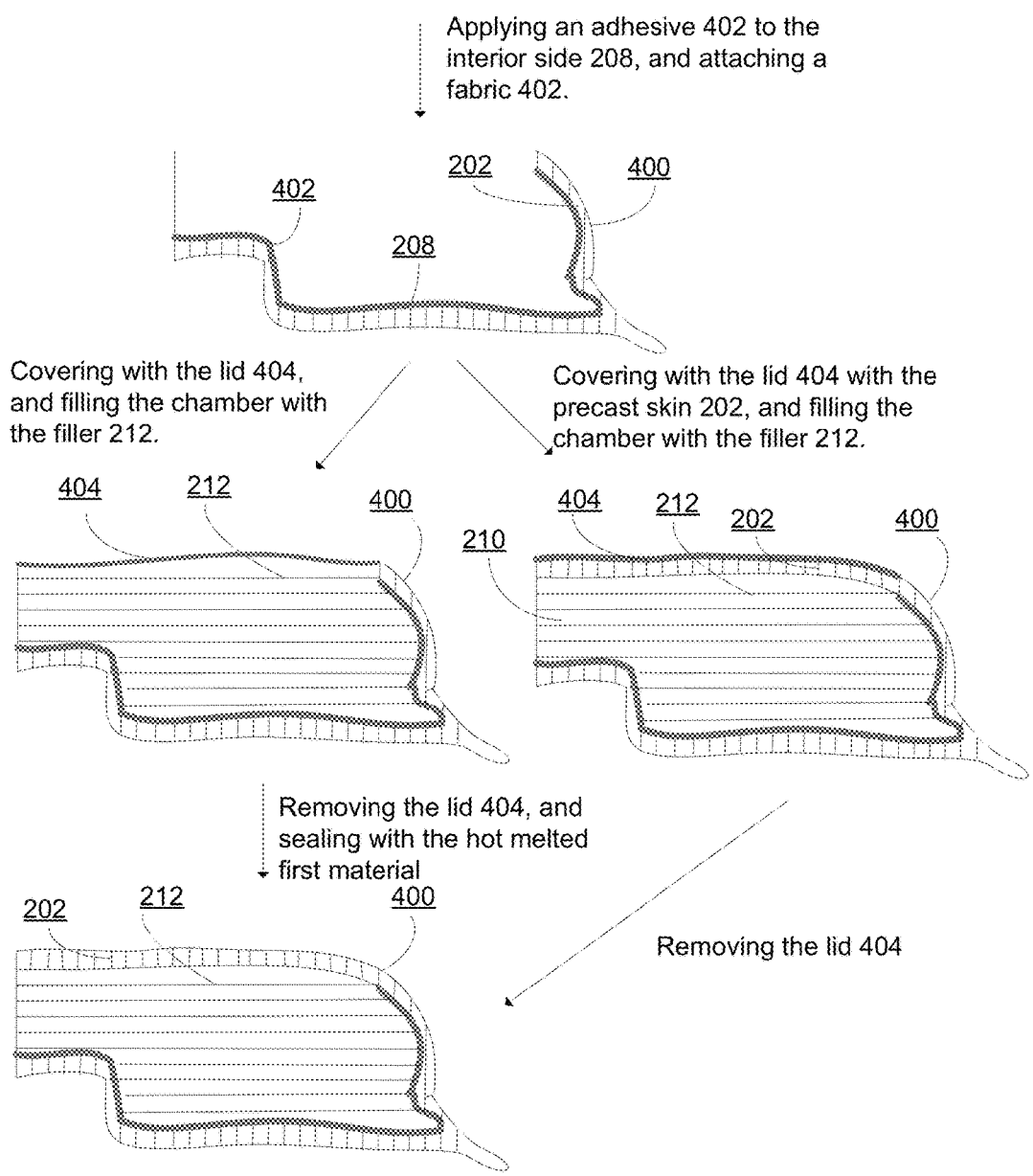

FIGS. 9A and 9B illustrates an exemplary process of fabricating an exemplary body 200 consistent with the disclosed embodiments. As shown in FIG. 9A, at the beginning, a first mold 400 with the shape of the body 200 is filled with a hot melted first material, such as a TPE/TPR, for making the doll. The first mold 400 may be filled up to a certain level. In certain embodiments, the first mold 400 is filled to a substantially full level. The first mold 400 may be made of any appropriate materials, such as epoxy resin, fiberglass, metal, plaster, and silicone.

In certain embodiments, the first material is a TPE/TPR. The TPE/TPR is melted by heating the TPE resin to an elevated temperature. For TPE materials used in making sex toys, a temperature ranged from 120 to 170 degrees Celsius is usually sufficient to melt the TPE resin. The melt temperatures may vary with polymer type and grade, and may be determined empirically.

The melted first material is allowed to settle in the first mold 400 for a pre-determined period of time, such as about two to five minutes. While the melted first material starts to solidify during the settling, a certain amount of first material is removed from the first mold 400 to leave a layer of the first material attached to the wall of the first mold 400 to form the skin 202. In certain embodiments, the melted first material may be poured out of the first mold 400. Because the melted first material may be viscous and the melted first material close to the wall of the first mold 400 may tend to solidify first, a layer of the first material attached to the wall of the first mold 400 may not be removed by pouring and may be left to form the skin 202.

The thickness of the skin 202 may be ranged from 1/8 inch to 1/2 inch, such as about 1/4 inch. The amount of the first material remaining in the first mold 400 and the thickness of the skin 202 may be controlled by controlling the pre-determined settling time and other factors. Such factors may be determined empirically. During the process of making the doll, the pre-determined settling time may be adjusted. In certain embodiments, a settling time of about two to five minutes allows the formation of skin with the thickness of about 1/4 inch when the melted first material is melted TPE/TPR.

After the skin 202 cools down and solidifies, an adhesive is applied to the interior side 208 of the skin 202 while the skin 202 is still in the first mold 400. In certain embodiments where the first material is a TPE, the adhesive is the same TPE resin of the first material for making the doll dissolved in a strong solvent, such as Toluene or Xylene. As shown in FIG. 9B, after the application of the adhesive, the skin 202 is covered with a fabric 402. The fabric 402 can be any material such as cotton, polyester or wool, or any similar fabric which generally has rough wooly texture on both sides. Such a material may help the bonding between the skin 202 and the filler 212.

After the skin 202 is fully covered in the fabric 402 and the fabric 402 is dry, a lid 404 is placed on the top of the first mold 400 and the space enclosed by the first mold 400 and the lid 404 is filled with the filler 212 such as a flexible Urethane foam. The softness, hardness and/or flexibility of filler 212 may also vary in different parts of the body 200. After the filler 212 is fully solidified, the lid 404 is removed and a melted first material is placed on top to seal the exposed filler 212. After the skin 202 over the filler 212 is formed, the body 200 is removed from the first mold 400. Alternatively, the melted first material may be pre-cast into the lid 404 to form a part of the skin 202. The lid 404 with part of the skin 202 may be placed on the top of the first mold 400. The chamber 210 enclosed by the skin 202 on the first mold 400 and the skin 202 on the lid 404 is filled with the filler 212. The body 200 may be further processed. For example, the body 200 may be cleaned, trimmed, ironed, powdered, and hand painted in some areas.

In certain embodiments, the filler 212 is a Urethane foam. The Urethane foam may be formed by mixing a Part A compound and a Part B compound, which are liquid under room temperature. The Part A compound may include a polymeric isocyanate and the Part B compound may include a polyol. The polyol is a higher molecular weight material manufactured from an initiator and monomeric building blocks. They may be classified as polyether polyols, which are made by the reaction of epoxides (oxiranes) with an active hydrogen containing starter compounds, or polyester polyols, which are made by the polycondensation of multi-functional carboxylic acids and hydroxyl compounds. In certain embodiments, the polyol is a polyether polyol. The softness of the Urethane foam may be adjusted by choosing different type of polyol in the Part B compound. Softer Urethane foam may result when a linear difunctional polyether polyol is used. More rigid Urethane may result if a multifunctional polyol is used.

Other compounds, such as surfactant and/or catalyst, may also be included in the Part A or the Part B. The ratio between the Part A compound and the Part B compound may be pre-determined. In certain embodiments, the ratio between the Part A compound and the Part B compound is about 30:70 (weight/weight). The ratio may be adjusted empirically.

The mixture of the Part A compound and the Part B compound, which remains fluid for a certain period of time, is filled in the chamber 210 formed by the skin 202 or the space between the skin 202 and the lid 404. The mixture is then allowed to settle in the chamber 210 or the enclosed space. The polymeric isocyanate and the polyol in the mixture may react to expand and solidify into a dry light-weighted foam form with open cells. The time period required for the Urethane foam to solidify may vary depending on the conditions such as room temperature and may be adjusted empirically. The time period may be ranged from 15 minutes to 24 hours. In certain embodiments, the Urethane foam is allowed 24 hours to solidify and dry completely.

Figure 10:
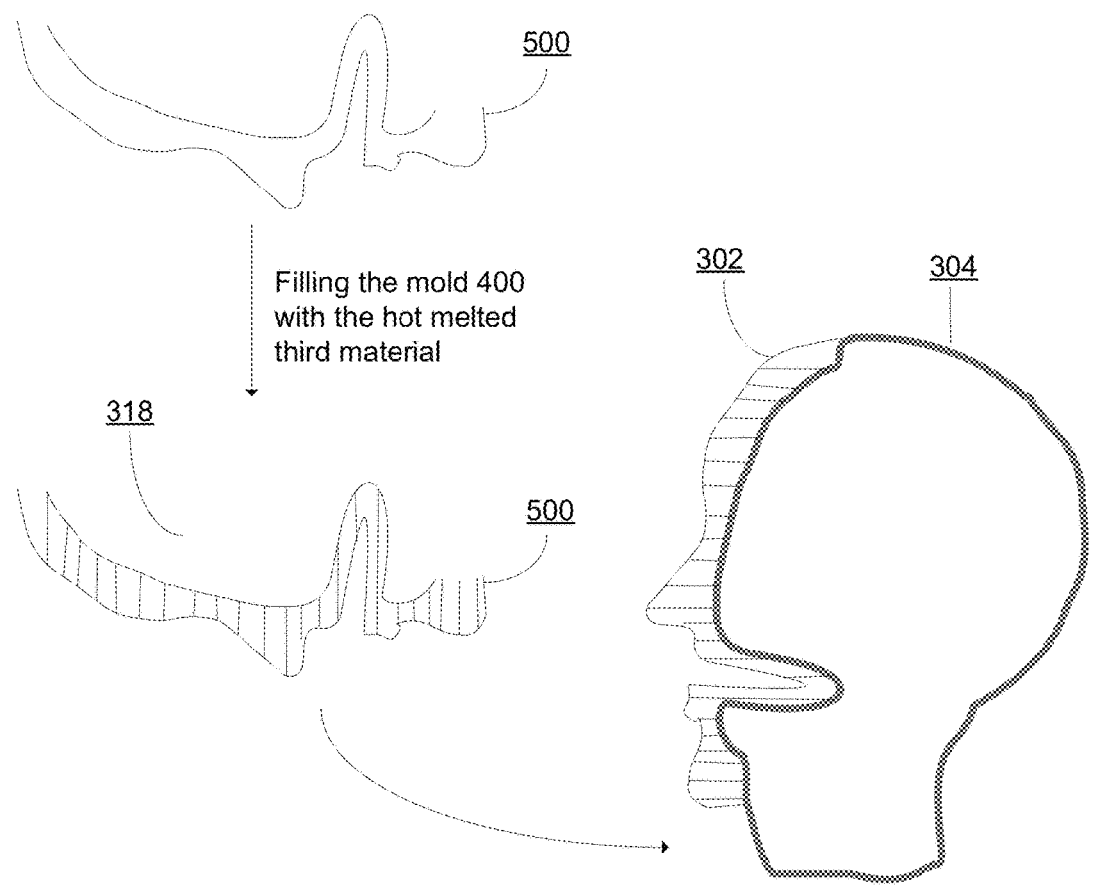
FIG. 10 illustrates an exemplary process of making a doll head portion consistent with the disclosed embodiments.

FIG. 10 illustrates an exemplary process of fabricating the head portion 300 consistent with the disclosed embodiments. As shown in FIG. 10, at the beginning, a second mold 500 with the contour of a human face is filled with a hot melted third material. The second mold 500 may be made of any appropriate materials, such as epoxy resin, fiberglass, metal, plaster, and silicone. The melted third material is allowed to settle in the second mold 500 and solidify to form the face mask 302. After the formation, the face mask 302 is removed from the second mold 500. A chamber 318 may be formed by the face mask 302. The chamber 318 may be filled after the face mask 302 is attached to the head 304 to form the head portion 300.

The head portion 300 may be further processed. For example, the head portion 300 may be cleaned, trimmed, ironed, powdered, and hand painted in some areas. The hair 350 may also be attached to the head portion 300.

Figure 11:
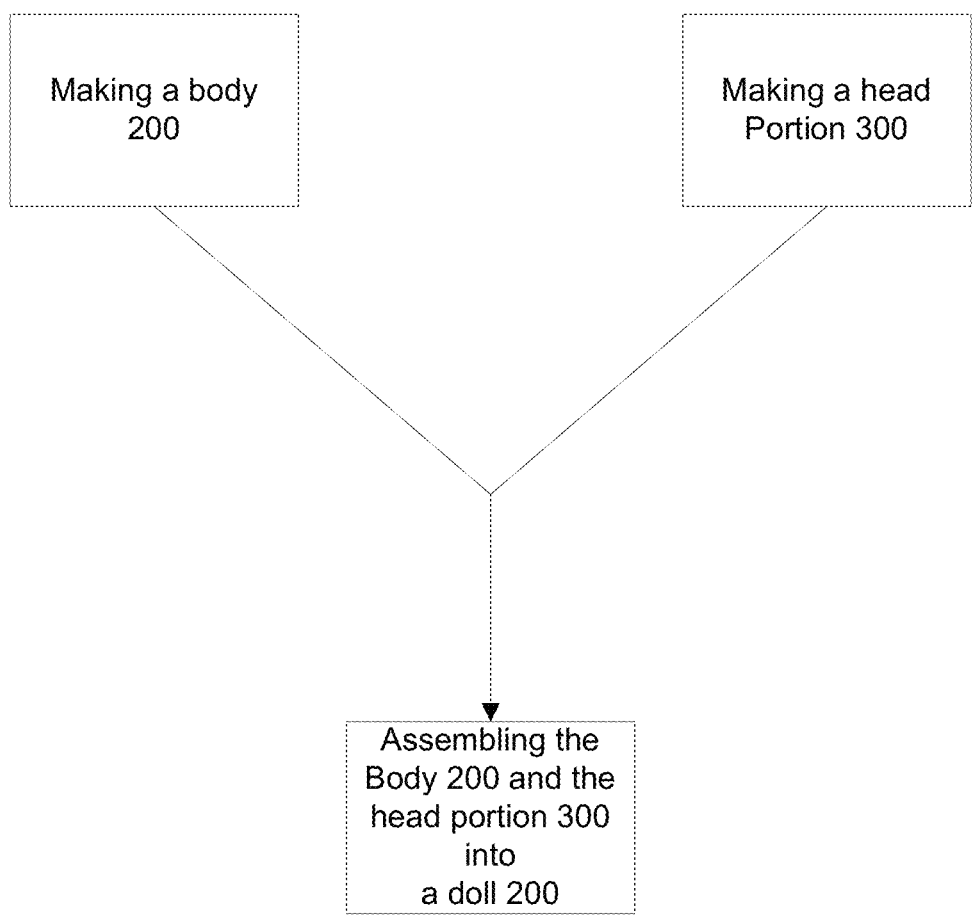
FIG. 11 illustrates an exemplary process of making a doll consistent with the disclosed embodiments.

FIG. 11 illustrates an exemplary process of making the doll 100 consistent with the disclosed embodiments. The head portion 300 and the body 200 may be fabricated separately and assembled together to form the doll 100.

A doll according to the present disclosure offers several advantages. The surface of the doll may have the feeling of human skin. A user may feel more comfortable with the doll. Further, a user may interact with the doll as the user might do with a human. For example, the user may touch or squeeze certain parts of the doll, such as the breast or bottom, as the user might do to a human. The doll according to the present disclosure is also generally light-weighted because only a thin layer of the skin is made of a material, such as TPE/TPR and the chamber is either hollow or filled with light-weighted material, such as Urethane foam. For example, a doll with the size of an average adult human may be about 30 pounds.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications. For example, the size, shape, appearance and the thickness of the skin of the doll according to the present disclosure may be adjusted to make a child's toy.

What is claimed is:

1. A doll comprising:
a layer of skin formed from a first material to simulate human skin, the skin having an interior side and an exterior side, wherein:
the skin is formed by placing the melted first material in a first mold configured to have an inside contour resembling a human body or body part up to a certain level of the first mold and, when the melted first material solidifies, removing certain amount of the melted first material such that the remaining first material in the first mold forms the skin with a thickness in the first mold, the human body or body part including a genital area resembling a human genital area;
a chamber enclosed by the layer of skin with the interior side of the skin facing the chamber;
a filler made of a second material, different from the first material, filling the space within the chamber wherein the filler has more than one hardness or flexibility level corresponding to different parts of the human body or body part;
a non-elastic fabric is attached to the interior side of the skin to facilitate a bonding between the skin and the filler; and
an attachment resembling a human sex organ attached to the genital area of the doll.

2. The doll of claim 1, further comprising:
a face mask formed from a third material to simulate human skin having a human skin texture or tactile feel, the face mask having an interior side and an exterior side, the exterior side having human face features; and
a head resembling a human head without face features, wherein:
the face mask is attached to the head with the interior side of the face mask contacting the head to give the head portion an appearance of a human head.

3. The doll of claim 1, wherein:
the first material is an elastomer.

4. The doll of claim 3, wherein:
the elastomer is selected from the group consisting of thermoplastic elastomer, thermoplastic rubber, and silicone.

5. The doll of claim 1, wherein:
the first material has a softness ranged from 00 to 20 in Shore Hardness 00 scale.

6. The doll of claim 1, wherein:
the body has a size of about an average adult human.

7. The doll of claim 1, wherein:
the filler is a Urethane foam.

8. The doll of claim 7, wherein:
the Urethane foam is formed by mixing a Part A compound and a Part B compound at a pre-determined ratio, and
the mixture of the Part A compound and the Part B compound is filled into the chamber while the mixture is fluid, wherein:
the Part A compound includes a polymeric isocyanate and the Part B compound includes a polyol.

9. The doll according to claim 1, further includes:
an orifice resembling a female human vagina opening in the genital area, wherein: the attachment resembles a vagina.

10. The doll according to claim 1, wherein:
the attachment resembles a human penis.

11. The doll of claim 1, wherein:
the non-elastic fabric has rough wooly texture on both sides.

12. The doll of claim 1, wherein:
the non-elastic fabric is at least one of cotton, polyester, and wool.

13. The doll according to claim 1, wherein:
the non-elastic fabric is attached to the interior side of a first part of the skin to facilitate the bonding between the first part of the skin and the filler; and
the interior side of a remaining part of the skin contacts the filler directly.

14. The doll according to claim 13, wherein:
the first part of the skin corresponding to a front part of the human body; and
the remaining part of the skin corresponding to a back part of the human body.

15. A process of making an artificial human body part, comprising:
providing a first mold configured to have an inside contour resembling a human body or body part, the body or body part having a genital area resembling a human genital area;
placing a melted first material into the first mold up to a certain level of the first mold;
when the melted first material solidifies, removing certain amount of the melted first material such that the remaining first material in the first mold forms a first part of a skin simulating human skin and having a human skin texture or tactile feel, the skin having an interior side and an exterior side, with the exterior side having the outward appearance of the human body or body part and a chamber being enclosed by the skin;

applying an adhesive to the interior side of the first part of the skin;

attaching a non-elastic fabric to the interior side of the first part of the skin to facilitate a bonding between the first part of the skin and a filler;

filling the chamber with the filler made of a second material, different from the first material, from an opening of the chamber such that the interior side of the skin contacting the filler wherein the filler has more than one hardness or flexibility level corresponding to different parts of the human body or body part;

placing the melted first material on top of the first mold to form a remaining part of the skin, wherein the interior side of the remaining part of the skin contacts the filler directly; and attaching an attachment resembling a human sex organ to the genital area of the doll.

16. The process of claim 15, wherein the second material is a Urethane foam.

17. The process of claim 16, further comprising:

mixing a Part A compound and a Part B compound at a pre-determined ratio, wherein the chamber is filled with the mixture of the Part A compound and Part B compound while the mixture is fluid, and the Part A compound includes a polymeric isocyanate and the Part B compound includes a polyol.

18. The process of claim 15, further comprising:

providing a second mold configured to have a contour resembling a human face;

placing a melted third material into the second mold to form a face mask simulating human skin, the face mask having an interior side and an exterior side, with the exterior side having human face features;

providing a head resembling a human head without the face features;

attaching the face mask to the head to form a head portion having an appearance of human head, and attaching the head portion to the body.

19. The process of claim 15, further comprising:

after the first part of the skin is covered by the non-elastic fabric and the non-elastic fabric is dry, placing a lid on top of the first mold before filling the chamber with the filler, wherein a space enclosed by the first mold and the lid is filled with the filler;

when the filler made of the second material solidifies, removing the lid; and placing the melted first material on top of the solidified filler to seal an exposed portion of the filler and to form the remaining part of the skin.

20. The process of claim 15, further comprising:

pre-casting the melted first material into a lid to form the remaining part of the skin;

after the skin is covered by the non-elastic fabric and the non-elastic fabric is dry, placing the lid on top of the first mold; and filling, with the filler made of the second material, the chamber enclosed by the first part of the skin inside the first mold and the remaining part of the skin on the lid.

* * * * *